(12) United States Patent
Murayama et al.

(10) Patent No.: US 9,777,751 B2
(45) Date of Patent: Oct. 3, 2017

(54) BRAKING DEVICE

(71) Applicants: HONDA MOTOR CO., LTD., Minato-ku, Tokyo (JP); NISSIN KOGYO CO., LTD., Ueda-shi, Nagano (JP)

(72) Inventors: Kazuaki Murayama, Wako (JP); Yoshiteru Matsunaga, Ueda (JP); Motoyasu Nakamura, Ueda (JP)

(73) Assignees: Honda Motor Co., Ltd., Tokyo (JP); Autoliv Nissin Brake Systems Japan Co., Ltd., Nagano (JP)

( * ) Notice: Subject to any disclaimer, the term of this patent is extended or adjusted under 35 U.S.C. 154(b) by 234 days.

(21) Appl. No.: 14/359,679

(22) PCT Filed: Nov. 21, 2012

(86) PCT No.: PCT/JP2012/080129
§ 371 (c)(1),
(2) Date: May 21, 2014

(87) PCT Pub. No.: WO2013/077342
PCT Pub. Date: May 30, 2013

(65) Prior Publication Data
US 2014/0298797 A1    Oct. 9, 2014

(30) Foreign Application Priority Data
Nov. 25, 2011   (JP) .................................. 2011-258336

(51) Int. Cl.
*B60T 7/04* (2006.01)
*F15B 15/02* (2006.01)
(Continued)

(52) U.S. Cl.
CPC .............. *F15B 15/02* (2013.01); *B60T 7/042* (2013.01); *B60T 8/368* (2013.01); *B60T 8/4081* (2013.01);
(Continued)

(58) Field of Classification Search
CPC ........ F15B 15/02; B60T 11/22; B60T 13/745; B60T 13/686; B60T 17/04; B60T 17/06;
(Continued)

(56) References Cited

U.S. PATENT DOCUMENTS

| 3,914,943 A | 10/1975 | Lewis |
| 4,705,324 A | 11/1987 | Kervagoret |

(Continued)

FOREIGN PATENT DOCUMENTS

| DE | 3609974 A1 | 10/1986 |
| DE | 3930384 C1 | 11/1990 |

(Continued)

OTHER PUBLICATIONS

Extended Search Report dated May 4, 2015 in relation to the corresponding European Patent Application No. 12851136.7.

*Primary Examiner* — Logan Kraft
*Assistant Examiner* — Abiy Teka
(74) *Attorney, Agent, or Firm* — Carrier Blackman & Associates, P.C.; William D. Blackman; Joseph P. Carrier

(57) ABSTRACT

Disclosed is a braking device in which all multiple ports (for example, input ports (15c, 15d) and output ports (15a, 15b)) provided on a front surface portion (30) of a base (10) of a master cylinder (1), connector connection ports (23a, 24a) of connectors (23, 24) that electrically conducts an electrical part accommodated in a housing (20), and a pipe connection port (3c) to which a hose is connected of a reservoir (3) are arranged toward front of a vehicle when a starting device (A1) is assembled in the vehicle.

10 Claims, 4 Drawing Sheets

(51) Int. Cl.
*B60T 11/16* (2006.01)
*B60T 8/36* (2006.01)
*B60T 8/40* (2006.01)
*B60T 13/68* (2006.01)
*B60T 13/74* (2006.01)
*B60T 11/22* (2006.01)
*B60T 13/14* (2006.01)
*B60T 13/66* (2006.01)
*B60T 17/04* (2006.01)

(52) U.S. Cl.
CPC ............ *B60T 11/16* (2013.01); *B60T 11/22* (2013.01); *B60T 13/146* (2013.01); *B60T 13/662* (2013.01); *B60T 13/686* (2013.01); *B60T 13/745* (2013.01); *B60T 17/04* (2013.01)

(58) Field of Classification Search
CPC .......... B60T 7/042; B60T 11/16; B60T 8/368; B60T 8/4081; B60T 13/146; B60T 13/662
See application file for complete search history.

(56) References Cited

U.S. PATENT DOCUMENTS

| | | | |
|---|---|---|---|
| 4,724,675 A | 2/1988 | Douillet | |
| 5,072,996 A | 12/1991 | Heibel et al. | |
| 5,607,207 A * | 3/1997 | Nagashima | B60T 8/368 188/356 |
| 5,711,151 A | 1/1998 | Engfer | |
| 5,988,767 A | 11/1999 | Inoue et al. | |
| 6,042,200 A * | 3/2000 | Hosoya | B60T 8/368 303/113.1 |
| 7,311,365 B2 * | 12/2007 | Nohira | B60T 8/368 303/119.1 |
| 2005/0067894 A1 | 3/2005 | Nohira | |
| 2010/0264723 A1* | 10/2010 | Atsushi | B60T 8/368 303/10 |
| 2011/0126534 A1 | 6/2011 | Ko et al. | |

FOREIGN PATENT DOCUMENTS

| | | |
|---|---|---|
| DE | 19523783 A1 | 1/1996 |
| DE | 4435623 A1 | 4/1996 |
| EP | 0356817 A1 | 3/1990 |
| GB | 2 188 995 A | 10/1987 |
| JP | S61-12460 A | 1/1986 |
| JP | S61-191460 A | 8/1986 |
| JP | S62-247960 A | 10/1987 |
| JP | 2-96250 U | 7/1990 |
| JP | 2007-076581 A | 3/2007 |
| JP | 2007-099057 A | 4/2007 |
| JP | 2007-099058 A | 4/2007 |
| JP | 2011084145 A | 4/2011 |

* cited by examiner

BRAKING DEVICE

TECHNICAL FIELD

The present invention relates to, for example, a braking device which can be assembled in a vehicle braking system and the like.

BACKGROUND ART

As a prior art, for example, in a Patent Literature 1, a vehicle braking device is disclosed which is capable of making an installation space smaller in assembling in a vehicle to integrate electromagnetic valves, fluid pressure sensors and an electronic control unit in compact. A rear output port which opens toward one side surface in a lateral direction of a cylinder tube and communicates with a rear output fluid pressure chamber and a front output port which opens toward an upper surface of the cylinder tube and communicates with a front output fluid pressure chamber are provided respectively in a master cylinder of the vehicle braking device.

PRIOR ART DOCUMENTS

Patent Literatures

Patent Literature 1: JP 2007-99057 A

SUMMARY OF THE INVENTION

Problems to be Solved by the Invention

When pipe line connection members such as flare pipes are connected to the rear output port and the front output port after the vehicle braking device disclosed in the Patent Literature 1 is assembled in the vehicle, since connection directions of the flare pipes to the rear output port and to the front output port are different from each other, the connection operation becomes complex.

In addition, for example, when a piping connection to a reservoir mounted to a cylinder tube and a connector connection to a housing connector are made in different directions from each other, connection operations therefor becomes further complicated.

In other words, in the prior braking device, connection portions of the fluid pressure system in which the flare pipes and the like are connected, the piping system in which a brake fluid is circulated and the electric system in which the electromagnetic valves and sensors are connected via connectors to be conducted electrically are generally set in different directions such as a front portion, a lateral direction portion and an upper portion of the master cylinder, respectively. Therefore, connection operations of each system after the braking device is assembled in the vehicle is turned out to be complicated.

The present invention generally aims to provide a braking device which is capable of simplifying connection operations for a fluid pressure system, a piping system and an electric system to improve assembling workability.

Means to Solve the Problems

In order to solve the above problems, in accordance with a first feature of the present invention, there is provided a braking device having a reservoir that stores a brake fluid and a master cylinder that generates brake fluid pressure by an operation with a brake operator, comprising: multiple ports in which a brake fluid is flown or from which the brake fluid is flown provided in a base of the master cylinder, wherein all the multiple ports are arranged toward front of a vehicle when assembled in the vehicle.

According to the first feature of the present invention, without being affected to a right-hand drive or a left-hand drive of a vehicle, for example, pipe connections such as flare pipes for a fluid pressure system can be made in a same direction from a front side of the vehicle. Consequently, in the invention, connection operations can be achieved so easily as to improve assembling workability.

Also, in accordance with a second feature of the present invention, there is provided the braking device wherein a housing that covers an electrical part assembled in the base is provided on the base of the master cylinder, the housing has a connector connection port through which the electrical part accommodated in the housing is electrically conducted, the reservoir has a pipe connection port to which a pipe body is connected, and the connector connection port and the pipe connection port are arranged toward the front of the vehicle when assembled in the vehicle.

According to the second feature of the present invention, by forming like this, without being affected to a right-hand drive or a left-hand drive of a vehicle, for example, hose connections for a piping system which circulates the brake fluid and electrical connections of connector connections for electrically conducting the electrical part can be made in a same direction from a front side of the vehicle, respectively. Consequently, in the invention, since all connection operations for the fluid pressure system, the piping system and the electrical system can be made in a same direction, connection operations becomes so easy as to improve assembling workability.

Also, in accordance with a third feature of the present invention, there is provided the braking device wherein all the multiple ports are arranged to offset to one side having the housing with respect to a plane passing through a central axis line of the master cylinder seen from front of the vehicle.

According to the third feature of the present invention, by forming like this, since all the multiple ports are proximately arranged together, connections to each port becomes simple and connection operation period (cycle time) is shortened.

Also, in accordance with a fourth feature of the present invention, there is provided the braking device wherein the connector connection port is arranged to offset to the one side having the housing with respect to the plane passing through the central axis line of the master cylinder seen from the front of the vehicle.

According to the fourth feature of the present invention, by forming like this, since both connector connection ports and the multiple ports are proximately arranged together at one side, various connections for the fluid pressure system and the electrical system become so simpler as to further shorten the connection operation period (cycle time).

Also, in accordance with a fifth feature of the present invention, there is provided the braking device wherein the base has a reservoir union port that communicates with the reservoir, and all the multiple ports, the connector connection port and the pipe connection port are arranged to offset to the one side having the housing with respect to a plane passing through an axis line of the reservoir union port seen from the front of the vehicle.

According to the fifth feature of the present invention, by forming like this, since all connection portions for the fluid pressure system, the piping system and the electrical system are proximately arranged together at the one side, various connections for the fluid pressure system, the piping system and the electrical system are turned out to be simpler. Therefore, the connection operation period (cycle time) can further be shortened. Consequently, productively can be improved and manufacturing cost can be decreased.

Effect of the Invention

The present invention can provide a braking device which is capable of simplifying connection operations for a fluid pressure system, a piping system and an electric system to improve assembling workability.

EMBODIMENTS FOR CARRYING OUT THE INVENTION

With reference to figures, embodiments of the invention will be explained in detail. In each figure, a front side of a vehicle is illustrated with "FR" and a rear side of the vehicle is illustrated with "RR".

Figure 1:
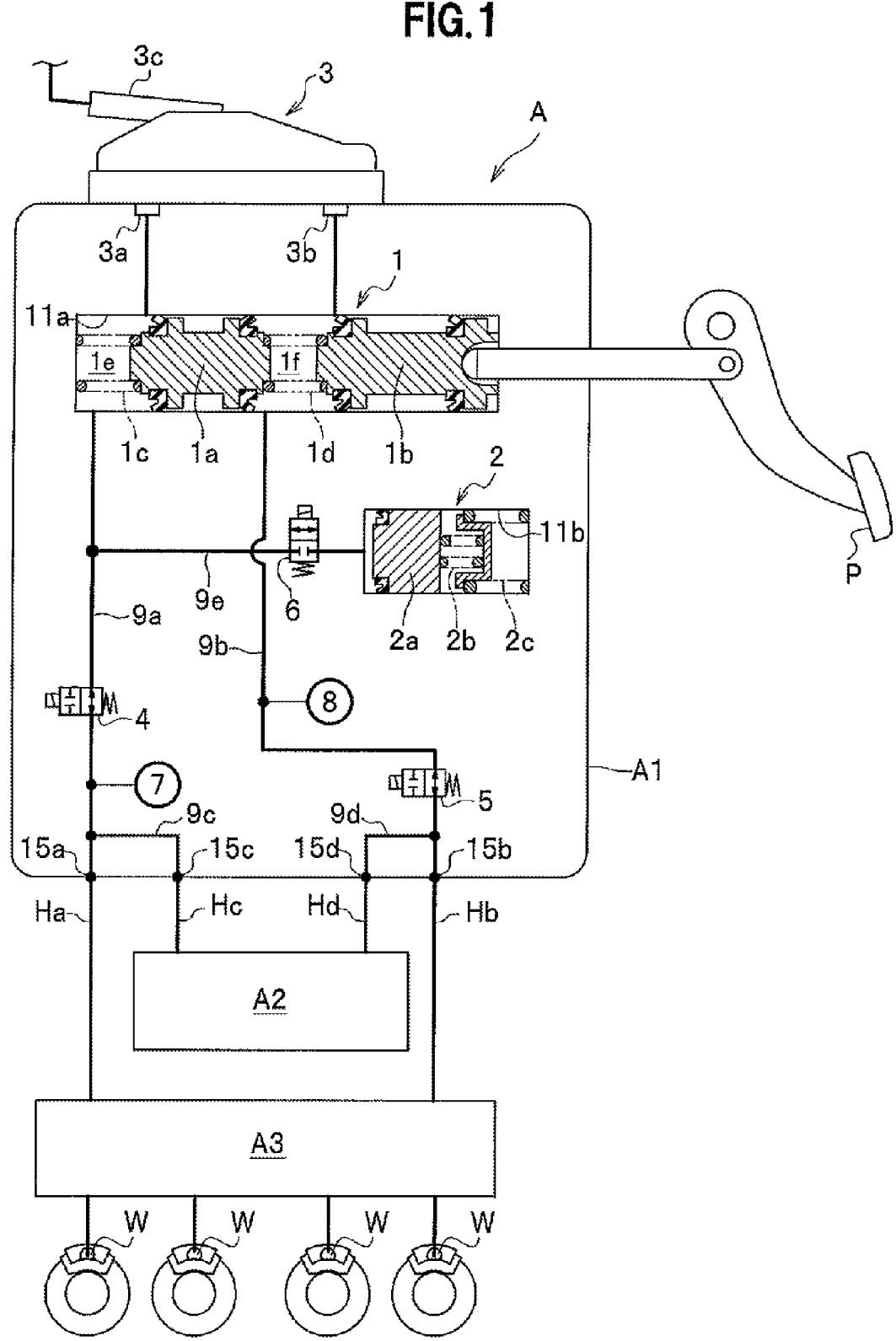
FIG. 1 shows a schematic illustration of a vehicle braking system in which a braking device according to an embodiment of the invention is assembled.

A vehicle braking system illustrated in FIG. 1 has a by-wire braking system which operates at the time of startup of a power engine (such as an engine and a motor) and a hydraulic braking system which operates in an emergency and at the time of power engine shutdown. In other words, the vehicle braking system has a starting device (braking device) A1 which generates brake fluid pressure by leg power through a brake pedal (brake operator) P, a motor cylinder device A2 which generates the brake fluid pressure through the use of an electric motor (not illustrated), and a vehicle stability assist device (referred as a "fluid pressure control device hereinbelow) A3 which supports stability of vehicle behavior. The starting device A1, the motor cylinder device A2 and the fluid pressure control device A3 are formed as separate units respectively and communicate via external pipes.

The vehicle braking system A can be mounted in a hybrid car using a motor together and an electric car/a fuel-cell car etc., having only a motor as power source, in addition to a car having only an engine (internal-combustion engine) as power source.

The starting device A1 has a tandem type master cylinder 1, a stroke simulator 2, a reservoir 3, normally-open type cutoff valves 4, 5, a normally-closed type cutoff valve 6, pressure sensors 7, 8, main fluid pressure passages 9a, 9b, and communication fluid pressure passages 9c, 9d and a branch fluid pressure passage 9e.

The master cylinder 1 is configured to convert the leg power of the brake pedal P into brake fluid pressure, and has a first piston 1a arranged at a bottom wall side of a first cylinder hole 11a, a second piston 1b connected to a push rod, a first return spring 1c arranged between the first piston 1a and a bottom wall of the first cylinder hole 11a, and a second return spring 1d arranged between the pistons 1a and 1b. The second piston 1b is connected to the brake pedal P via the push rod. The pistons 1a and 1b slidingly contact under the leg power of the brake pedal P and pressurize a brake fluid in pressure chambers (fluid pressure chambers) 1e, 1f. The pressure chambers 1e, 1f communicates with the main fluid pressure passages 9a, 9b.

The stroke simulator 2 is configured to generate pseudo reaction force of manipulation, and has a piston 2a slidingly contacting in the second cylinder 11b, a smaller return spring 2b and a larger return spring 2c which bias piston 2a. The stroke simulator 2 communicates with the pressure chamber 1e via the main fluid pressure passage 9a and the branch fluid pressure passage 9e and operates by the brake fluid pressure generated in the pressure chamber 1e.

The reservoir 3 is, for example, a plastic container for storing the brake fluid, and has fuel filler ports 3a, 3b connected to the master cylinder 1 and a pipe connection port (nipple) 3c which is connected with a hose (pipe body) extending from a main reservoir (not illustrated).

The normally-open type cutoff valves 4, 5 are configured to open/close the main fluid pressure passages 9a, 9b, and are normally-open type electromagnetic valves. One normally-open type cutoff valve 4 opens/closes the main fluid pressure passage 9a in a section from an intersection of the main fluid pressure passage 9a and the branch fluid pressure passage 9e to an intersection of the main fluid pressure passage 9a and the communication fluid pressure passage 9c. The other normally-open type cutoff valve 5 opens/closes the main fluid pressure passage 9b in an upstream side of an intersection of the main fluid pressure passage 9b and the communication fluid pressure passage 9d.

The normally-closed cutoff valve 6 is configured to open/close the branch fluid pressure passage 9e and is a normally-closed type electromagnetic valve.

The pressure sensors 7, 8 are configured to detect magnitude of the brake fluid pressure and are mounted in a sensor mounting hole (not illustrated) communicating with the main fluid pressure passage 9a, 9b. One pressure sensor 7 is arranged at a downstream side of the normally-open type cutoff valve 4, and when the normally-open type cutoff valve 4 is in a closed state (the state in which the main fluid pressure passage 9a is cutoff), the pressure sensor 7 detects the brake fluid pressure generated in the motor cylinder device A2. The other pressure sensor 8 is arranged in an upstream side of the normally-open type cutoff valve 5, and when the normally-open type cutoff valve 5 is in a closed state (the state in which the main fluid pressure passage 9b is cutoff), the pressure sensor 8 detects the brake fluid pressure generated in the master cylinder 1. Information acquired by the pressure sensors 7, 8 is output to an electronic control unit (ECU) (not illustrated).

The main fluid pressure passages 9a, 9b are fluid pressure passages having the master cylinder 1 as starting point. Pipe materials Ha, Hb extending to the fluid pressure control device A3 are connected to the output ports 15a, 15b as ends of the main fluid pressure passages 9a, 9b.

The communication fluid pressure passages 9c, 9d are fluid pressure passages extending from the input ports 15c, 15d to the main fluid pressure passages 9a, 9b. Pipe materials Hc, Hd extending to the motor cylinder device A2 are connected to the input ports 15c, 15d.

The branch fluid pressure passage 9e is a fluid pressure passage which branches from one main fluid pressure passage 9a and extends to the stroke simulator 2.

The starting device A1 communicates with the fluid pressure control device A3 via the pipe materials Ha, Hb, and the brake fluid pressure generated in the master cylinder 1 with an open state of the normally-open type cutoff valves 4, 5 is input to the fluid pressure control device A3 via the main fluid pressure passages 9a, 9b and the pipe materials Ha, Hb.

The motor cylinder device A2 is configured to generate the brake fluid pressure by displacing a slave piston with assistance of an electric motor (electric motor drive) which is driven in response to operation amount of the brake pedal (brake operator) P, and has the slave piston which slidingly contacts in a slave cylinder, an actuator mechanism which has the electric motor and a driving force transmission section, and a reservoir which stores the brake fluid in the slave cylinder. The electric motor operates based on signals from the electronic control unit (not illustrated). The driving force transmission section converts rotational driving force of the electric motor to a back and forward movement and transmits the converted movement to the slave piston. The slave piston receives the driving force of the electric motor to slidingly contact in the slave cylinder and pressurizes the brake fluid therein. The brake fluid pressure generated in the motor cylinder device A2 is temporarily input in the starting device A1 via the pipe materials Hc, Hd and is output to the fluid pressure control device A3 via the communication fluid pressure passages 9c, 9d and pipe materials Ha, Hb.

The fluid pressure control device A3 has a structure by which anti-lock brake control (ABS control) suppressing wheel slip, skidding control stabilizing vehicle behavior, traction control and the like can be executed, and is connected to the wheel cylinders W, W, . . . via the pipe materials. Although not illustrated, the fluid pressure control device A3 has a fluid pressure unit which is provided with electromagnetic valves, pumps etc., a motor which drives the pumps, the electronic control unit which controls the electromagnetic valve, a motor, etc., and the like.

Next, an operation of the vehicle braking system A will be briefly explained.

During a normal period in which the vehicle braking system A normally functions, the normally-open type cutoff valves 4, 5 are in the closed state and the normally-closed cutoff valve 6 is in the open state. When the brake pedal P is operated in this state, the brake fluid pressure generated in the master cylinder 1 is transmitted not to the wheel cylinders W but to the stroke simulator 2. Displacement of the piston 2a allows the brake pedal P to stroke and the pseudo reaction force of manipulation is given to the brake pedal P.

Further, when stepped amount (stroke amount) of the brake pedal P is detected by a stroke sensor (not illustrated) or the like, the electric motor of the motor cylinder device A2 is driven to displace the slave piston so that the brake fluid in the slave cylinder is pressurized. The electronic control unit (not illustrated) compares the brake fluid pressure output from the motor cylinder device A2 (the brake fluid pressure detected by the pressure sensor 7) with the brake fluid pressure output from the master cylinder 1 (the brake fluid pressure detected by the pressure sensor 8) and controls rotational speed etc. of the electric motor based on the comparison result.

The brake fluid pressure generated in the motor cylinder device A2 is transmitted to the wheel cylinders W, W, . . . via the fluid pressure control device A3 and braking force is given to each wheel by operating each wheel cylinder W.

When the motor cylinder device A2 is in a non-operable situation (for example, electric power is cutoff or in an emergency), since both normally-open type cutoff valves 4, 5 are in an open state and the normally-closed type cutoff valve 6 is in a closed state, the brake fluid pressure generated in the master cylinder 1 is transmitted to the wheel cylinders W, W, . . . .

Next, a specific structure of the starting device A1 will be explained.

Figure 2:
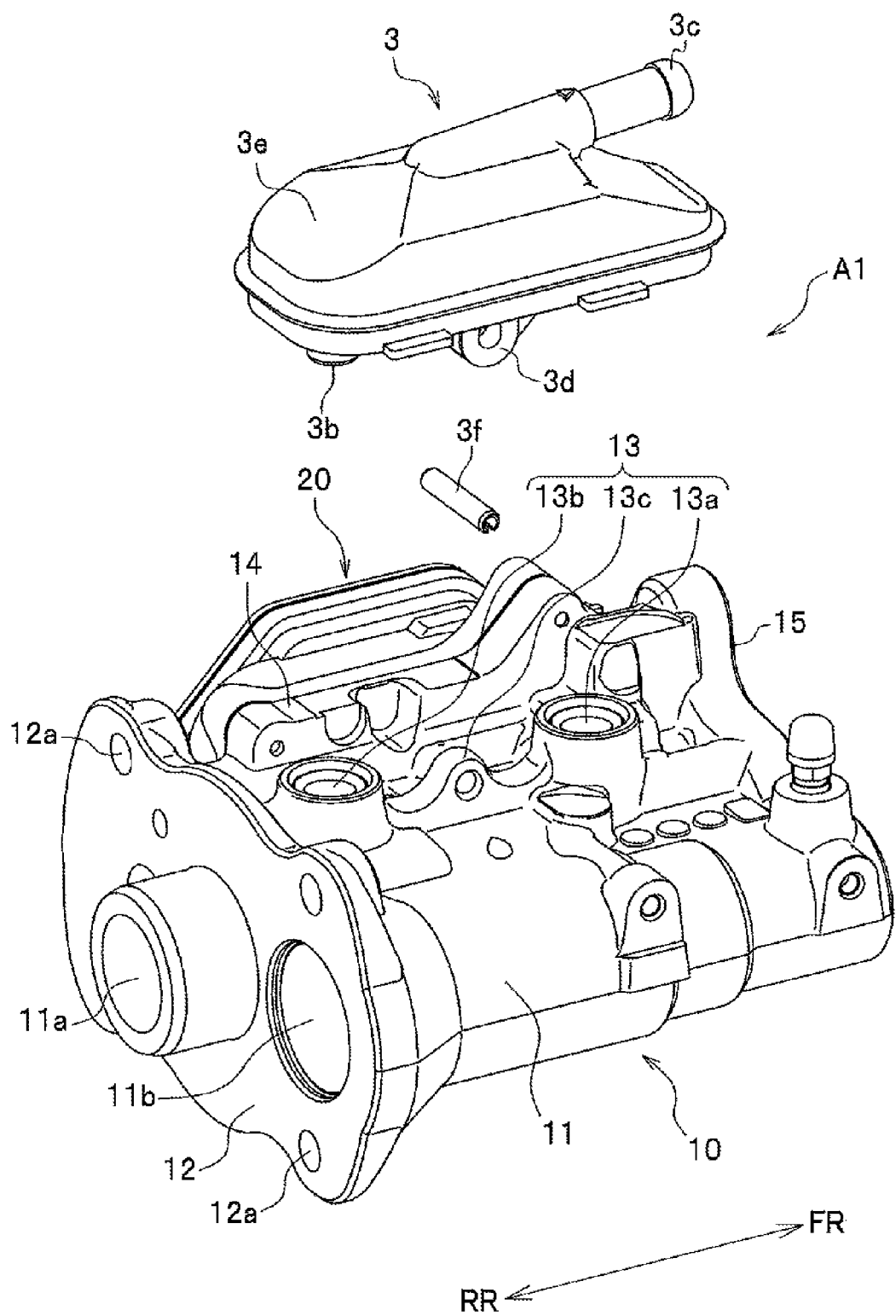
FIG. 2 shows an exploded perspective view of the braking device in FIG. 1 seen from a rear side.

The starting device A1 of the embodiment is formed in which various parts mentioned above are mounted inside or on the base 10 illustrated in FIG. 2 and electrical parts (the normally-open type cutoff valves 4, 5, the normally-closed type cutoff valve 6 and the pressure sensors 7, 8) are covered by a housing 20.

The base 10 is a casting made of aluminum alloy, and has a cylinder portion 11, a body fixing portion 12, a reservoir mounting portion 13, a housing attachment portion 14 and a pipe connection portion 15. Further, bores (not illustrated) as the main fluid pressure passages 9a, 9b and the branch fluid pressure passage 9e are formed inside the base 10.

The first cylinder hole 11a for the master cylinder 1 and the second cylinder hole 11b for the stroke simulator 2 are formed in the cylinder portion 11. Both cylinder holes 11a, 11b are in a bottomed cylindrical shape, open to the body fixing portion 12 and extend to the pipe connection portion 15. The first cylinder hole 11a is inserted with the parts (the first piston 1a, the second piston 1b, the first return spring 1c and the second return spring 1d) constituting the master cylinder 1 (see FIG. 1), and the second cylinder hole 11b is inserted with the parts (the piston 2a, the return springs 2b and 2c) constituting the stroke simulator 2.

The body fixing portion 12 is a portion which is fixed on a body component such as a toe board and is formed on a rear surface portion of the base 10. The body fixing portion 12 is formed in a flange shape. Bolt insertion bores 12a, 12a, . . . are formed on a peripheral portion (portion projected from the cylinder portion 11) of the body fixing portion 12.

The reservoir portion 13 is a portion as mounting eye for the reservoir 3 and is formed on an upper surface portion of the base 10. The reservoir mounting portion 13 is formed with two reservoir union ports 13a, 13b and a connection portion 13c. Both the reservoir union ports 13a, 13b are formed in a cylindrical shape and projects from an upper surface of the cylinder portion 11. The reservoir union ports 13a, 13b communicate with the first cylinder hole 11a via bores extending from the bottom surface thereof to the first cylinder hole 11a.

The reservoir union ports 13a, 13b are connected with the fuel filler ports 3a, 3b (see FIG. 1) of the reservoir 3 via a seal member (not illustrated), and a container body of the reservoir 3 is placed on upper ends of the reservoir union ports 13a, 13b. The connection portion 13c is formed between the reservoir union ports 13a and 13b.

The reservoir 3 has the pipe connection port 3c and a pair of connection legs 3d as illustrated in FIG. 2 besides the fuel filler ports 3a, 3b (see FIG. 1). When the starting device A1 is assembled in the vehicle, the pipe connection port 3c projects toward front (FR) of the vehicle from a container body 3e storing the brake fluid. The pipe connection port 3c is connected with a hose (pipe body) extending from the main reservoir (not illustrated) from the front (FR) side of the vehicle. The reservoir 3 is fixed on the upper side of the base 10 by inserting a spring pin 3f into bores respectively formed in the pair of connection legs 3d and the connection portion 13c.

Figure 3:
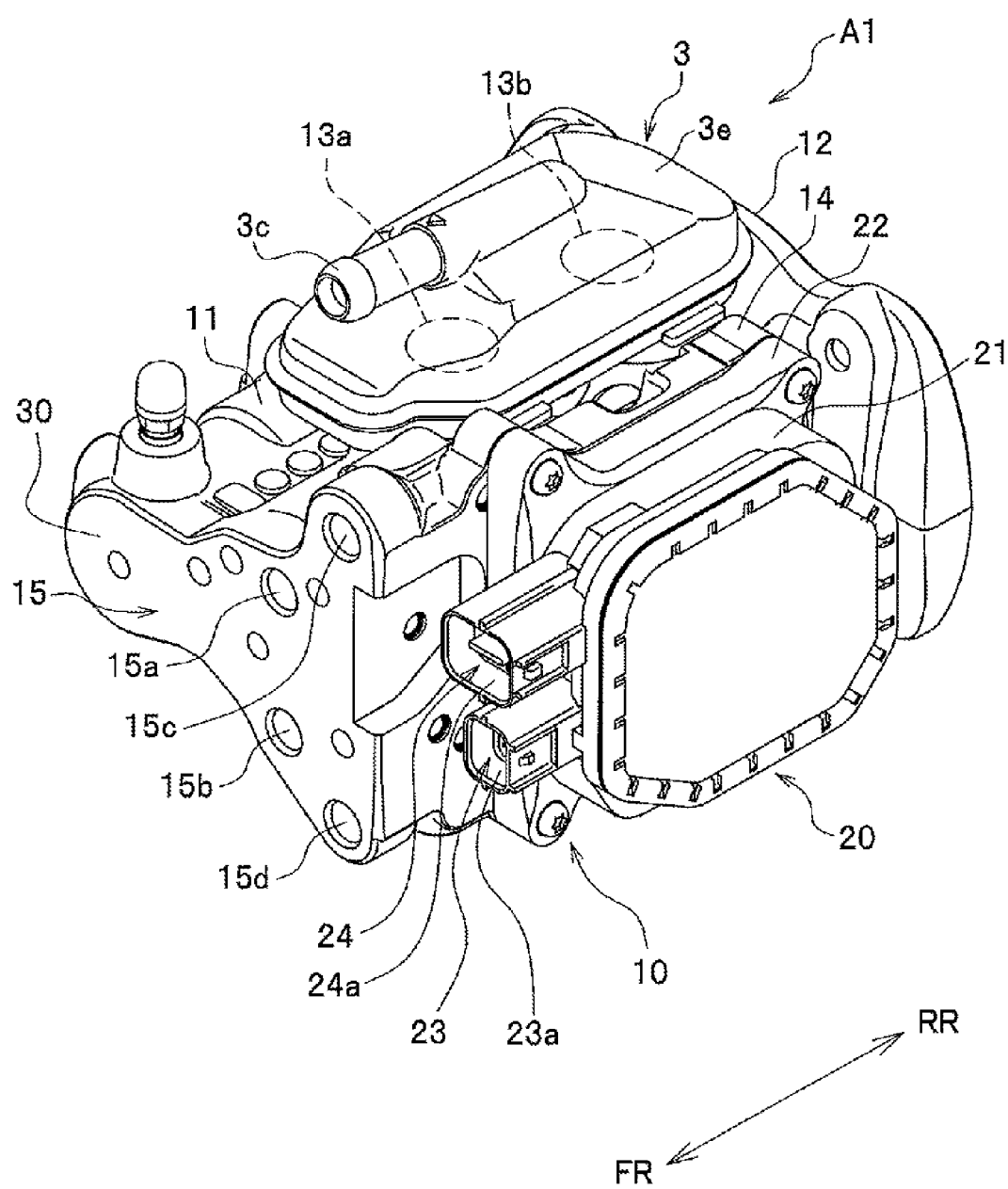
FIG. 3 shows a perspective view of the braking device in FIG. 1 seen from a front side.

The housing attachment portion 14 is a portion as mounting eye for the housing 20 and is formed on a side surface portion of the base 10. The housing attachment portion 14 is formed in a flange shape as illustrated in FIG. 3. An upper end portion and a lower end portion of the housing attachment portion 14 project toward up and down with respect to the cylinder portion 11. Female screws are formed in the upper end portion and the lower end portion (portions projected from the cylinder portion 11) of the housing attachment portion 14. Although not illustrated, three valve mounting holes and two sensor mounting holes are formed in the housing attachment portion 14. The normally-open type cutoff valves 4, 5 and the normally-closed type cutoff valve 6 (see FIG. 1) are assembled in the three valve mounting holes and the pressure sensors 7, 8 (see FIG. 1) are assembled in the two sensor mounting holes.

Figure 4:
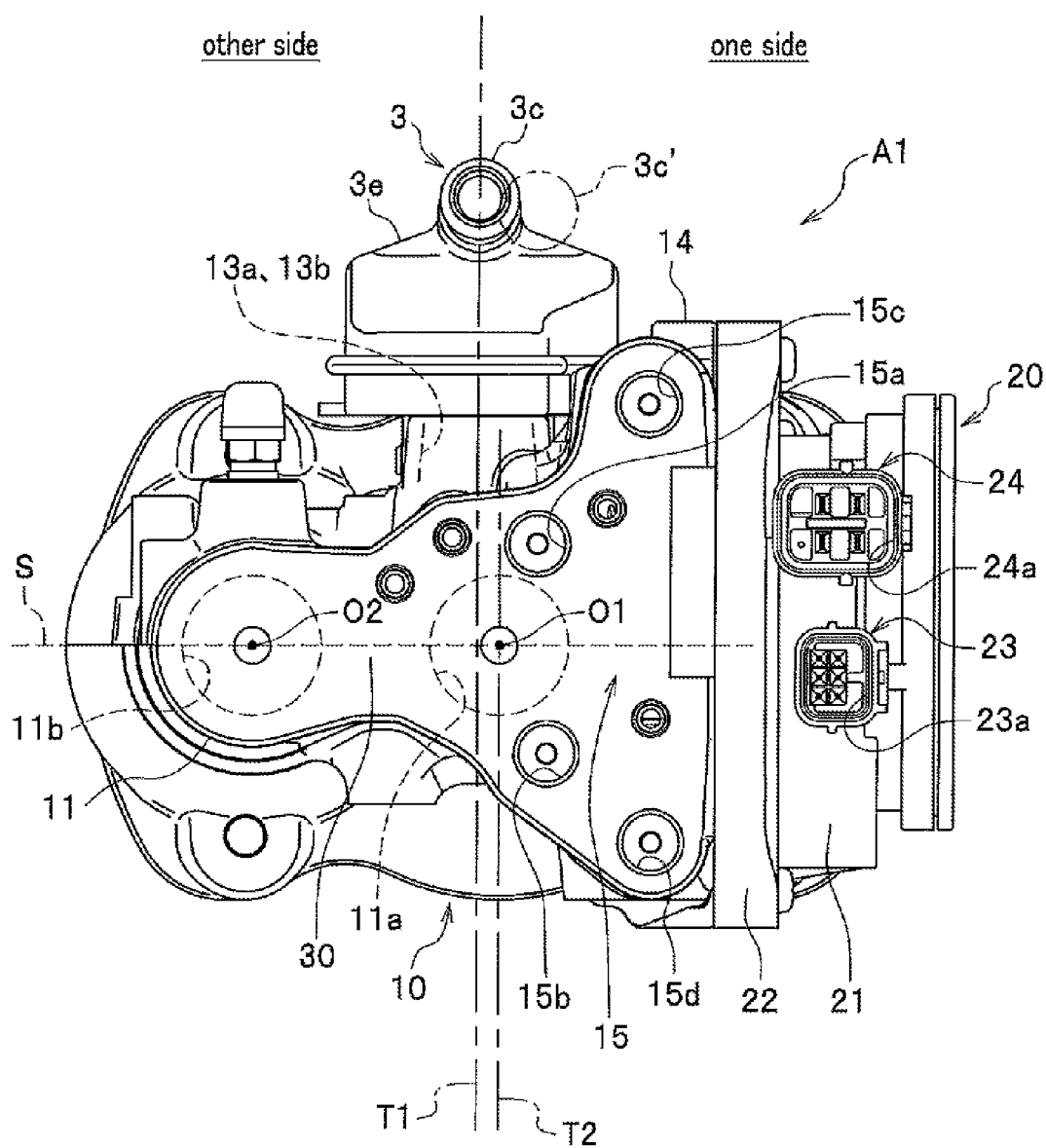
FIG. 4 shows a front view of the braking device in FIG. 1 seen from front of a vehicle.

FIG. 4 is a front view of the braking device illustrated in FIG. 1 seen from the front of the vehicle.

As illustrated in FIGS. 3 and 4, the pipe connection portion 15 is a portion as mounting eye for the pipe and is formed on a front surface portion 30 of the base 10. The two output ports (multiple ports) 15a, 15b and the two input ports (multiple ports) 15c, 15d are arranged approximately in a truncated chevron shape on the front surface portion 30 as a flat surface of the base 10. Further, a separation distance between the two input ports 15a and 15b is set shorter than that between the two input ports 15c and 15d. The pipe materials Ha, Hb (see FIG. 1) extending to the fluid pressure control device A3 are connected to the output ports 15a, 15b, and the pipe materials Hc, Hd (see FIG. 1) extending to the motor cylinder device A2 are connected to the input ports 15c, 15d.

In this case, as illustrated in FIG. 4, the two output ports 15a, 15b are respectively arranged at positions adjacent to a plane (vertical plane) passing through an axis line T1 of the reservoir union port 13a. The two input ports 15c, 15d are respectively arranged at positions adjacent to the housing 20.

When the starting device A1 is assembled in the vehicle, all the multiple ports (for example, the two output ports 15a, 15b and the two input ports 15c, 15d) provided on the front surface portion 30 are arranged toward the front (FR) of the vehicle. Shortly, the output port 15a and the input port 15c are arranged above a flat plane S passing through a central axis line O1 of the first cylinder hole 11a in the master cylinder 1 and a central axis line O2 of the second cylinder hole 11b in the stroke simulator 2. The output port 15b and the input port 15d are arranged below the flat plane S.

Further, the output port 15a and the input port 15c arranged above the flat plane S are provided to communicate with the pressure chamber 1e (see FIG. 1) at the front in the master cylinder 1. The output port 15b and the input port 15d arranged below the flat plane S are provided to communicate with the pressure chamber 1f (see FIG. 1) at the rear in the master cylinder 1.

Still further, as illustrated in FIG. 4, all the multiple ports (for example, the output ports 15a, 15b and the input ports 15c, 15d) provided on the front surface portion 30 are arranged to offset to one side having the housing 20 with respect to a plane (the plane passing through the central axis line O1 and perpendicular to the flat plane S) passing through the axis line T2, seen from the front of the vehicle. The axis line T2 is an imaginary line passing through the central axis line O1 of the master cylinder 1.

Furthermore, as illustrated in FIG. 4, all the multiple ports (for example, the output ports 15a, 15b and the input ports 15c, 15d) provided on the front surface portion 30 and connector connection ports 23a, 24a of the connectors 23, 24 are arranged to offset to the one side having the housing 20 with respect to the plane (the plane passing through the central axis line O1 and perpendicular to the flat plane S) passing through the axis line T2, seen from the front of the vehicle. The axis line T2 is the imaginary line passing through the central axis line O1 of the master cylinder 1.

Furthermore, as illustrated in FIG. 4, when the pipe connection port 3c of the reservoir 3 is arranged to offset to the one side as a pipe connection port 3c', all the multiple ports (for example, the output ports 15a, 15b and the input ports 15c, 15d) provided on the front surface portion 30, the connector connection ports 23a, 24a of the connectors 23, 24, and the offset pipe connection port 3c' of the reservoir 3 are arranged to offset to the one side having the housing 20 with respect to the plane (vertical plane) passing through the axis line T1 of the reservoir union port 13a (13b), seen from the front of the vehicle.

The housing 20 has an housing body 21 covering the electrical parts (the normally-open type cutoff valves 4, 5, the normally-closed type cutoff valve 6 and the pressure sensors 7, 8) assembled on the housing attachment portion 14 of the base 10 liquid-tightly, a flange portion 22 formed around the housing body 21, and the two connectors 23, 24 projected on the housing body 21.

Inside the housing body 21, though not illustrated, electromagnetic coils for driving the normally-open type cutoff valves 4, 5 and the normally-closed type cutoff valve 6, and a bus bar extending to the electromagnetic coils and the pressure sensors 7, 8, and the like are accommodated.

The flange portion 22 is a portion which is crimped on the housing attachment portion 14. In the flange portion 22, screw insertion bores are formed in accordance with the female screws in the housing attachment portion 14.

The connectors 23, 24 have the cylindrical connector connection ports 23a, 24a respectively and are projected on the front surface of the housing body 21. When the starting device A1 is assembled in the vehicle, the connector connection ports 23a, 24a are arranged toward the front (FR) of the vehicle, respectively. The connectors 23, 24 are connected with cables to the electromagnetic coils and cables to the pressure sensors 7, 8.

In the embodiment, all the multiple ports (for example, the input ports 15c, 15d and the output ports 15a, 15b) are arranged toward the front (FR) of the vehicle with respect to the front surface portion 30 of the base 10 of the master cylinder 1. Therefore, for example, pipe connections for fluid pressure system such as flare pipes can be connected in a same direction from the front side of the vehicle regardless whether the vehicle is a right-hand drive or a left-hand drive. Consequently, in the embodiment, connection operations for fluid pressure system can be made easily, resulting in improvement of assembling workability.

Also, in the embodiment, the connector connection ports 23a, 24a of the connectors 23, 24 and the pipe connection port 3c of the reservoir 3 are also arranged toward the front of the vehicle. Therefore, for example, hose connections of a piping system which circulates the brake fluid and electric connections for connector connection to electrically conduct the electrical parts (such as the normally-open type cutoff valves 4, 5, the normally-closed type cutoff valve 6, the pressure sensors 7, 8 illustrated in FIG. 1) can be made in a same direction from the front side of the vehicle, respectively. Consequently, in the embodiment, since all connection operations for the fluid pressure system, the piping system and the electric system can be made in a same direction, connection operations are made simpler and assembling workability can be more improved.

Further, in the embodiment, seen from the front of the vehicle, all the multiple ports (for example, the input ports 15c, 15d and the output ports 15a, 15b) provided on the front surface portion 30 are arranged to offset to the one side having the housing 20 with respect to the plane (vertical plane) passing through the axis line T2 (T2: the axis line passing through the central axis line O1 of the master cylinder 1) and all the ports including the input ports 15c, 15d and the output ports 15a, 15b are proximally arranged together at the one end (see FIG. 4). Therefore, connections to the ports are simplified and connection operation period (cycle time) can be shortened. Besides, arrangement of passages which communicates with the input ports 15c, 15d and the output ports 15a, 15b can be simplified in the base 10 of the master cylinder 1.

Still further, seen from the front of the vehicle, in the embodiment, all the multiple ports (for example, the input ports 15c, 15d and the output ports 15a, 15b) provided on the front surface portion 30 and the connector connection ports 23a, 24a of the connectors 23, 24 are arranged to offset to the one side having the housing 20 with respect to the plane (vertical plane) passing through the axis line T2 (T2: the axis line passing through the central axis line O1 of the master cylinder 1) (see FIG. 4).

Still further, in the embodiment, all the multiple ports (for example, the input ports 15c, 15d and the output ports 15a, 15b) provided on the front surface portion 30, the connector connection ports 23a, 24a of the connectors 23, 24, and the offset pipe connection port 3c' of the reservoir 3 are arranged to offset to the one side having the housing 20 with respect to the plane passing through the axis line T1 of the reservoir union port 13a (13b).

In the embodiment, since all the connection portions of the fluid pressure system, the piping system and the electric system are proximately arranged together at the one side by arranging described above, various connections for the fluid pressure system, the piping system and the electric system are simplified. Therefore, the connection operation period (cycle time) can be more shortened. As a result, productivity rises and manufacturing cost decreases.

Vehicles applied with the vehicle brake system A includes, for example, four-wheel drive vehicles (4 WD), front-wheel drive vehicles (FF), rear-wheel drive vehicles (FR), automatic two-wheel vehicles, automatic three-wheel vehicles and the like.

EXPLANATION OF REFERENCES

A vehicle braking system
A1 starting device (braking device)
A2 motor cylinder device
A3 fluid pressure control device
O1, O2 central axis line
P brake pedal (brake operator)
S flat plane
T1, T2 axis line
W wheel cylinder
1 master cylinder
2 stroke simulator
3 reservoir
3a, 3b fuel filler port
3c, 3c' pipe connection port
3d connection leg
3e container body
3f spring pin
4, 5 normally-open type cutoff valve (electrical part)
6 normally-closed type cutoff valve (electrical part)
7, 8 pressure sensor (electrical part)
9a, 9b main fluid pressure passage
9c branch fluid pressure passage
10 base
11 cylinder portion
11a first cylinder hole
11b second cylinder hole
12 body fixing portion
13 reservoir mounting portion
13a, 13b reservoir union port
13c connection portion
14 housing attachment portion
15 pipe connection portion
15a, 15b output port (multiple ports)
15c, 15d input port (multiple ports)
20 housing
23, 24 connector
23a, 24a connector connection port
30 front surface portion

The invention claimed is:

1. A braking device having a reservoir that stores a brake fluid and a master cylinder that generates brake fluid pressure by an operation with a brake operator, said braking device comprising a base of the master cylinder having multiple ports formed therein including at least one inlet port into which a brake fluid is input and plural outlet ports from which the brake fluid is output, said multiple ports provided proximate one another on a single side of the base of the master cylinder, wherein the outlet ports do not function as inlet ports when the brake fluid is input into the inlet ports, and all of said multiple ports face in the same direction.

2. The braking device according to claim 1, further comprising a housing that covers an electrical part assembled in the base, said housing provided on the base of the master cylinder, wherein:
the housing has a connector connection port through which the electrical part accommodated in the housing is electrically conducted,
the reservoir has a pipe connection port to which a pipe body is connected, and
the connector connection port and the pipe connection port face in the same direction as the multiple ports.

3. The braking device according to claim 2, wherein all the multiple ports are arranged offset to one side, with respect to a vertical plane passing through a central axis line of the master cylinder.

4. The braking device according to claim 3, wherein the connector connection port is arranged offset to the one side, with respect to the vertical plane passing through the central axis line of the master cylinder.

5. The braking device according to claim 2, wherein the base has a reservoir union port that communicates with the reservoir, and all the multiple ports, the connector connection port and the pipe connection port are arranged offset to the one side with respect to a vertical plane passing through an axis line of the reservoir union port.

6. A braking device having a reservoir that stores a brake fluid and a master cylinder that generates brake fluid pressure by an operation with a brake operator, said braking device comprising:
a base of the master cylinder having multiple ports formed therein including at least one inlet port into which a brake fluid is input and a plurality of outlet ports from which the brake fluid is output, said multiple ports provided proximate one another on a single side of the base of the master cylinder,
and a housing that covers an electrical part assembled in the base, said housing provided on the base of the master cylinder, the housing having a connector connection port through which the electrical part accommodated in the housing is electrically connected, wherein the outlet ports do not function as inlet ports when the brake fluid is input into the inlet ports, and all of said multiple ports and the connector connection port all face in the same direction.

7. The braking device according to claim 6, wherein the reservoir has a pipe connection port to which a pipe body is connected, and the pipe connection port faces in the same direction as the multiple ports and the connector connection port.

8. The braking device according to claim 6, wherein all the multiple ports are arranged offset to one side, with respect to a vertical plane passing through a central axis line of the master cylinder.

9. The braking device according to claim 6, wherein the connector connection port is arranged offset to the one side, with respect to the vertical plane passing through the central axis line of the master cylinder.

10. The braking device according to claim 6, wherein the base has a reservoir union port that communicates with the reservoir, and all the multiple ports, the connector connection port and the pipe connection port are arranged offset to the one side with respect to a vertical plane passing through an axis line of the reservoir union port.

* * * * *